United States Patent [19]
Kim et al.

[11] Patent Number: 6,104,017
[45] Date of Patent: Aug. 15, 2000

[54] SPITTING DEVICE FOR USE IN A MICROWAVE OVEN

[75] Inventors: Jong Hun Kim, Seongnam; Dae Rae Kim, Jeongnam-myon; Jae Man Cho, Suwon, all of Rep. of Korea

[73] Assignee: SamSung Electronics Co., Ltd., Suwon, Rep. of Korea

[21] Appl. No.: 09/355,929

[22] PCT Filed: Dec. 11, 1998

[86] PCT No.: PCT/KR98/00422

§ 371 Date: Aug. 12, 1999

§ 102(e) Date: Aug. 12, 1999

[87] PCT Pub. No.: WO99/31439

PCT Pub. Date: Jun. 24, 1999

[30] Foreign Application Priority Data

Dec. 12, 1997 [KR] Rep. of Korea ............... 97-68393
Dec. 12, 1997 [KR] Rep. of Korea ............... 97-68394
Dec. 12, 1997 [KR] Rep. of Korea ............... 97-68395
Dec. 22, 1997 [KR] Rep. of Korea ............... 97-72040
Dec. 26, 1997 [KR] Rep. of Korea ............... 97-74519
Dec. 26, 1997 [KR] Rep. of Korea ............... 97-74520

[51] Int. Cl.$^7$ ............................. H05B 6/80; A47J 37/04
[52] U.S. Cl. ...................... 219/732; 219/762; 99/419; 99/421 R; 99/DIG. 14
[58] Field of Search ..................... 219/732, 725, 219/762; 99/419, 421 R, 421 V, 421 HV, 421 HH, DIG. 14; D7/683, 684, 685

[56] References Cited

U.S. PATENT DOCUMENTS

| D. 275,639 | 9/1984 | Kramer ............................ D7/106 |
| 2,458,239 | 1/1949 | Bartlett .............................. 99/419 |
| 2,584,295 | 2/1952 | Sanzenbacher . | |
| 3,931,758 | 1/1976 | Blake ................................ 99/419 |
| 5,069,117 | 12/1991 | Schlessel ......................... 99/419 |
| 5,129,451 | 7/1992 | Moir . | |
| 5,814,795 | 9/1998 | Kim et al. ........................ 219/732 |

FOREIGN PATENT DOCUMENTS 0 648 065 A2 4/1995 European Pat. Off. .
2 215 187 9/1989 United Kingdom .

Primary Examiner—Philip H. Leung
Attorney, Agent, or Firm—Robert E. Bushnell, Esq.

[57] ABSTRACT

A device for spitting foodstuffs to be cooked in a cooking chamber of a microwave oven comprising a supporting member and many spit members supported by a fixing member. Each of the spit members has a fixing part engaged with the supporting member, a connection part extended outward in a radial direction from the fixing part, and many spit parts in parallel extended upward from the connection part. Thus, many a small foodstuff can be supported conveniently.

20 Claims, 9 Drawing Sheets

SPITTING DEVICE FOR USE IN A MICROWAVE OVEN

TECHNICAL FIELD

The present invention relates to a spitting device used in a microwave oven, and more particularly, to a spitting device having a plurality of spit parts for spitting foodstuffs for cooking barbecue.

BACKGROUND ART

FIG. 1 is a perspective view of a microwave oven having a conventional spitting device and FIG. 2 is an enlarged exploded perspective view of the spitting device shown in FIG. 1.

In the cooking chamber 2 of a microwave oven 1, a tray 3 rotated by a motor (not shown) is installed. When a user places foodstuffs on the tray 3 and then operates the microwave oven, the foodstuffs are cooked by microwaves radiated onto the foodstuffs.

A variety of tools for supporting the foodstuffs in the cooking chamber 2 have been proposed. One of the tools is a spitting device 100 shown in FIGS. 1 and 2. An oil tray 4 for receiving oil dropping from the foodstuff 5 while cooking barbecue is placed on the tray 3, and the spitting device 100 is placed on the oil tray 4.

The spitting device 100 is comprised of a central spit member 110 for spitting the foodstuff 5, a supporting member 120 supported by the central spit member 110 and a plurality of spit members 130 removably fixed on the supporting member 120.

The central spit member 110 is manufactured by bending a single wire, and is comprised of an upright central spit part 111 and a supporting part 113 having the shape of a partial ring extended from the lower end of the central spit part 111. The part connecting the central spit part 111 and the supporting part 113 with each other is bent into a predetermined shape so as to form a hooking part 112.

The supporting member 120 takes the shape of a cylinder, and has a through-going hole 121 formed on the central area thereof, through which the central spit part 111 passes. In addition, a plurality of fixing holes 122 are formed on the upper side of the supporting member 120, and a hooking recess 123 is formed on the lower part of the supporting member 120. As the central spit part 111 passes through the through-going hole 121, the hooking recess 123 is assembled with the hooking part 112 of the central spit member 110. Then, the supporting member 120 is supported by the central spit member 110 at a predetermined height.

The spit member 130 is comprised of a spit part 131 for spitting a foodstuff, a fixing part 132 inserted into the fixing hole 122, and a connection part 133 connecting the spit part 131 and the fixing part 132 with each other. By inserting/ disassembling the fixing part 132 into/from the fixing hole 122, the spit member 130 can be fixed/disassembled onto/ from the supporting member 120 easily.

When a user wants to cook a single foodstuff, he supports the foodstuff, using the central spit member 110 only. When he wants to cook many foodstuffs, he supports the foodstuffs, using all of the spit members 130 and the central spit member 110.

In such a conventional spitting device 100, a number of spit members 130 must be prepared to cook a number of small foodstuffs. However, since the supporting member 120 has only a limited number of fixing holes 122, relatively a small number of spit members 130 can be installed on the supporting member 120. Accordingly, such a conventional spitting device 100 is not appropriate in cooking a lot of foodstuffs.

Furthermore, in such a conventional spitting device 100, since all of he spit parts 131 are equally distanced from the central spit part 111, the foodstuffs are arranged circularly around the central spit part 111. Thus, it provides low efficiency in using the space of the cooking chamber 2.

Moreover, in such a conventional spitting device 100, since the height of the spit member 130 is fixed, the foodstuff is always adjusted according to the fixed height, irrespective of the size thereof. Therefore, it may be hard to accommodate a voluminous foodstuff in the cooking chamber 2, and, to cook a lot of small foodstuffs, they may be arranged only in the lower area of the cooking chamber 2.

DISCLOSURE OF INVENTION

The present invention has been proposed to overcome the above-described problems in the prior art, and accordingly, the object of the present invention is to provide a spitting device capable of spitting a number of foodstuffs by employing spit members respectively having a number of spit parts.

Another object of the present invention is to provide a spitting device capable of adjusting the height of the spit members appropriately according to the size of the foodstuffs to be cooked.

To achieve the above object, the present invention provides a spitting device for cooking barbecue in a microwave oven, comprising: a supporting member having a plurality of fixing holes; and a plurality of spit members respectively having a fixing part engaged with each of the fixing holes, a connection part extended outward in a radial direction from the fixing part, and a plurality of spit parts in parallel extended upward from the connection part.

The spit part is comprised of a first spit part bent upward from an end of the connection part and a second spit part installed in an area between the end of the connection part and the fixing part. The second spit part is removably fixed by a holder installed on the connection part. Preferably, the holder is capable of sliding along a longitudinal direction of the connection part. It is possible that a pair of connection parts, a pair of spit parts, and the fixing part interconnecting the connection parts with each other are formed in a single body using a single wire.

To achieve the above-described another object, the present invention provides a spitting device for cooking barbecue in a microwave oven, comprising: a central spit member having an upright central spit part for spitting a foodstuff to be cooked, and a supporting part for supporting the central spit member to stand upright; a supporting member having a through-going hole through which the central spit part passes, the supporting member being capable of moving up and down along the central spit part; and a plurality of spit members respectively having a spit part for spitting a foodstuff, the spit members being installed removably on the supporting member, wherein a hooking part is formed on an area of the central spit member, and a plurality of hooking sections different in height are formed on a lower part of the supporting member, the hooking sections selectively hooked by the hooking part.

BRIEF DESCRIPTION OF DRAWINGS

The present invention will be better understood and its various objects and advantages will be more fully appreciated from the following description taken in conjunction with the accompanying drawings, in which.

BEST MODE FOR CARRYING OUT THE INVENTION

Hereinafter, the present invention will be described in detail with reference to the accompanying drawings.

Figure 1:
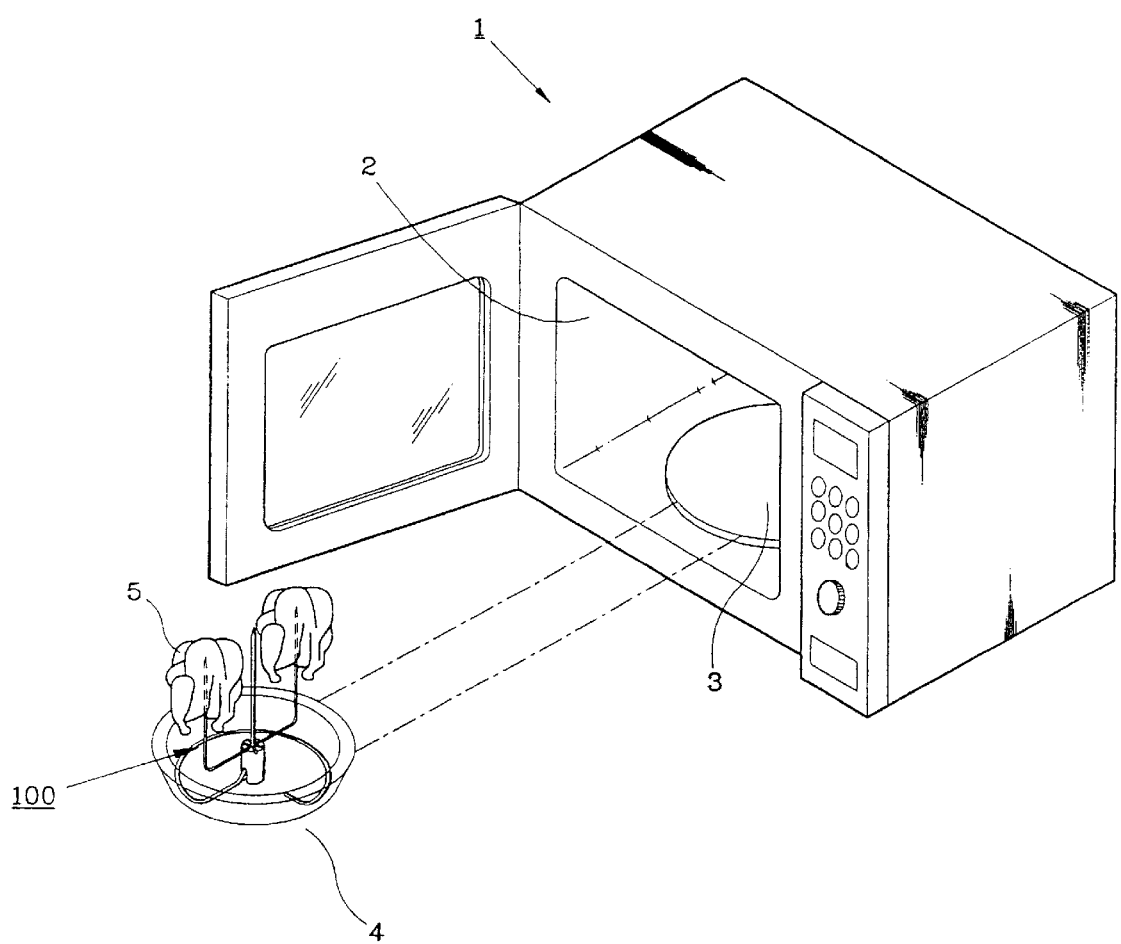
FIG. 1 is a perspective view of a microwave oven having a conventional spitting device.
Figure 2:
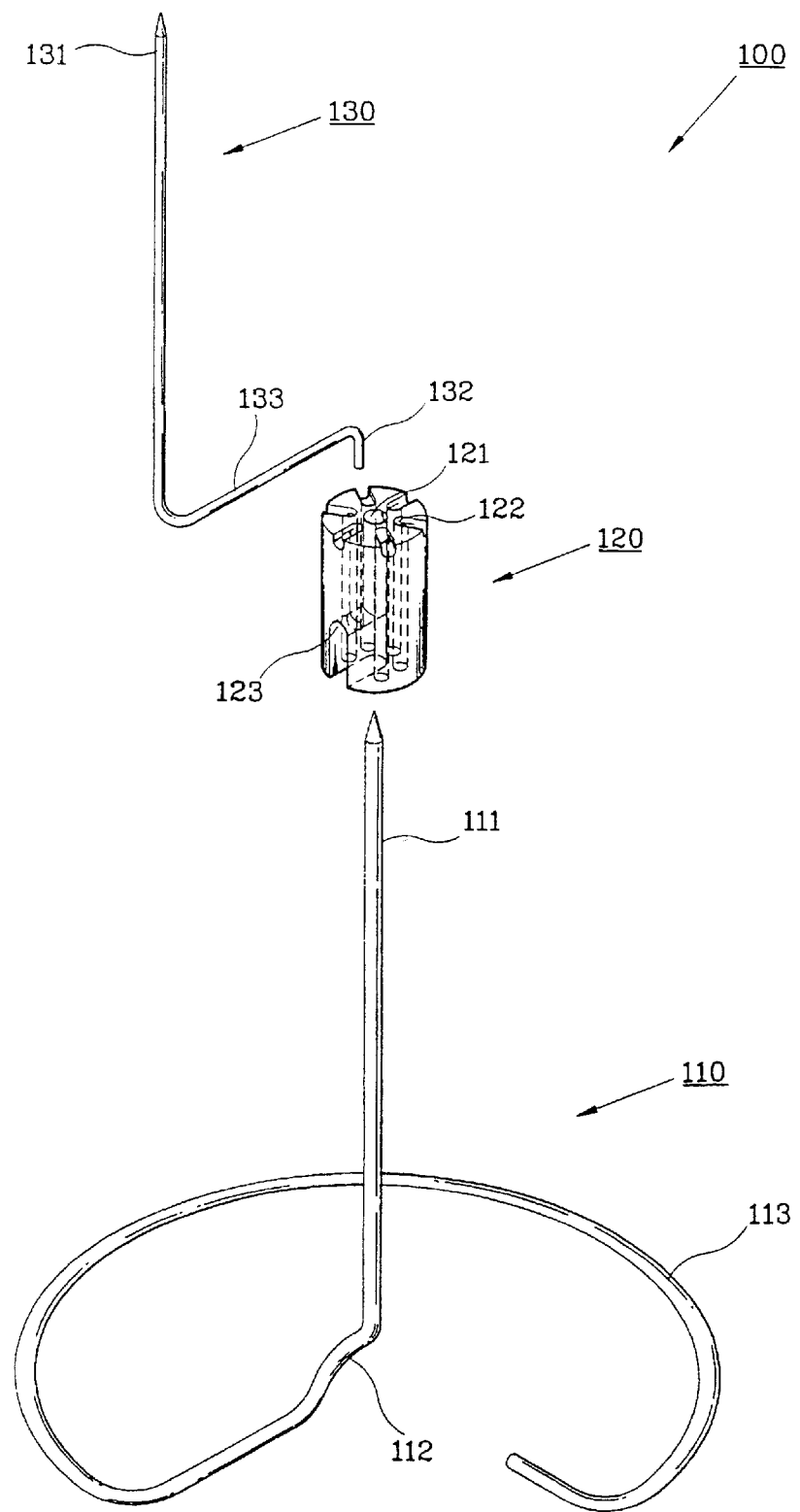
FIG. 2 is an enlarged exploded perspective view of the spitting device shown in FIG. 1.
Figure 3:
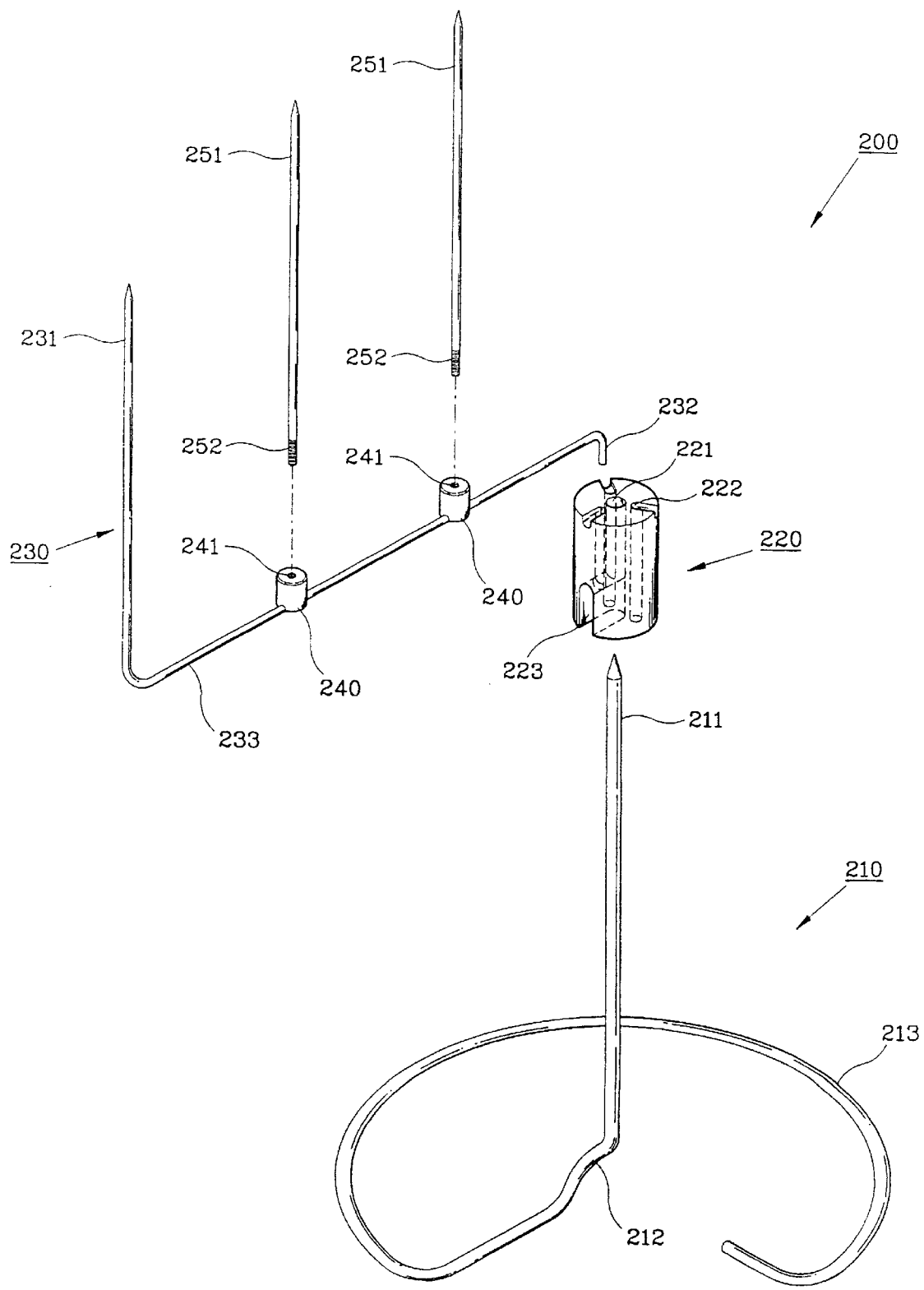
FIG. 3 is an exploded perspective view of a spitting device according to the first embodiment of the present invention.

FIG. 3 shows a spitting device 200 according to the first embodiment of the present invention. The spitting device 200 is comprised of a central spit member 210 for spitting the foodstuff, a supporting member 220 supported by the central spit member 210 and a plurality of spit members 230 removably fixed on the supporting member 220. Only one of the spit members 230 is shown in FIG. 1 for the convenience of illustration; in fact, a plurality of spit members 230 are radially disposed on the supporting member 220.

The central spit member 210 is manufactured by bending a single wire, and is comprised of an upright central spit part 211 for spitting the foodstuff and a supporting part 213 having the shape of a partial ring which is extended from the lower end of the central spit part 211 and curved into an arc shape. The supporting part 213 serves to support the central spit part 211, so it is maintained in the upright state. The part interconnecting the central spit part 211 and the supporting part 213 is bent into a predetermined shape to form a hooking part 212.

The supporting member 220 has a shape of a cylinder, and has a through-going hole 221 formed on the central area thereof, through which the central spit part 211 passes. In addition, a plurality of fixing holes 222 are formed on the upper side of the supporting member 220 and a hooking recess 223 is formed on the lower part of the supporting member 220. As the central spit part 211 passes through the through-going hole 221, the hooking recess 223 is assembled with the hooking part 212 of the central spit member 210. Then, the supporting member 220 is supported by the central spit member 210 at a predetermined height.

The spit member 230 is comprised of three spit parts 231, 251 for spitting foodstuffs, a fixing part 232 inserted into the fixing hole 222, and a connection part 233 connecting the spit part 231 and the fixing part 232. By inserting/disassembling the fixing part 232 into/from the fixing hole 222, the spit member 230 can be fixed/disassembled onto/from the supporting member 220 easily.

The connection part 233 is extended outward from the fixing part 232 in a radial direction. The spit parts 231, 251 are comprised of the first spit part 231 extended upward from the end of the connection part 233 and the second spit parts 251 installed on the connection part 233. The second spit parts 251 are in parallel with the first spit part 231. In the present embodiment, the number of spits in-the second spit parts 251 is two; however, the number of spits in the second spit parts 251 can be one, or more than two.

On the area between the end of the connection part 233 and the fixing part 232 are installed a pair of holders 240 for fixing the second spit parts 251 on the connection part 233. Screw parts 252 are formed on the lower end of the second spit part 251, and holders 240 have a respective screw assembly part 241 assembled with the screw part 252. By the assembly of the screw parts 252 and the screw assembly parts 241, the second spit parts 251 are fixed on the connection part 233. As described above, the fixing part 232, the connection part 233, and the first spit part 231 are manufactured by bending a single wire, and the second spit parts 251 are removably fixed onto the connection part 233 using the holders 240.

When a user wants to cook a single foodstuff, he supports the foodstuff, using the central spit member 210 only. When he wants to cook is lots of foodstuffs, he supports the foodstuffs, using all of the spit members 230 and the central spit member 210. When the user wants to cook the foodstuffs much more, i. e., many sliced meats, he installs the second spit parts 251 on the connection part 233. Since the number of spit parts 231 and 251 can be adjusted, the foodstuffs can be cooked conveniently.

Figure 4:
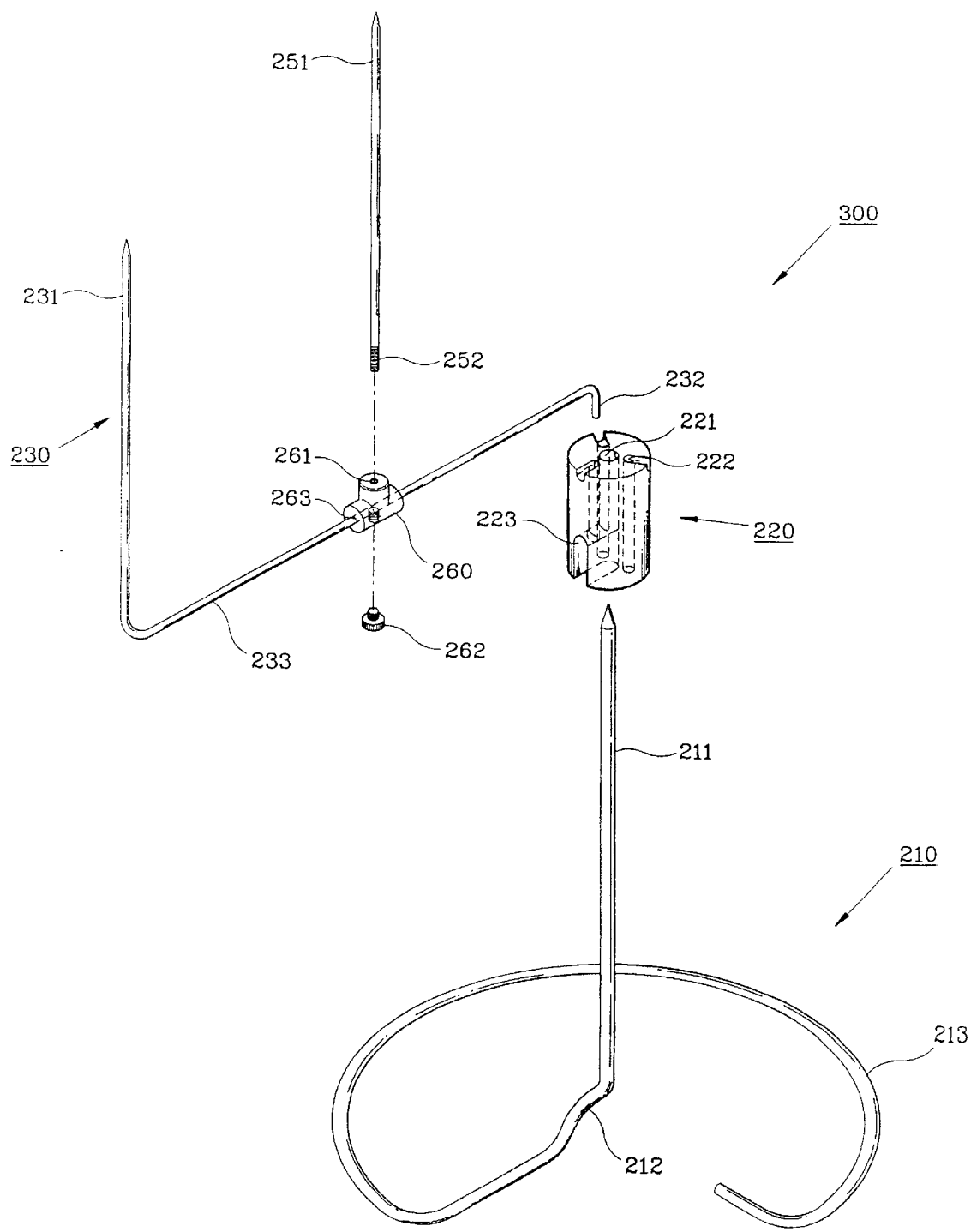
FIG. 4 is an exploded perspective view of a spitting device according to the second embodiment of the present invention.

FIG. 4 shows a spitting device 300 according to the second embodiment of the present invention. In the description of this embodiment and the following third and fourth embodiments, parts substantially identical to those in the above-described first embodiment will be referred to with the same reference numerals, and the detailed description thereof will be omitted.

In the present embodiment, the central spit member 210 and the supporting member 220 are the same in construction as the first embodiment. The fixing part 232, the connection part 233, the first spit part 231 and the second spit part 251 are also the same in construction as the first bodiment. The only difference of the present embodiment is in the construction of the holder 260 for fixing the second spit part 251 onto the connection part 233.

The holder 260 has a passing hole 263 formed on the central part thereof, through which the connection part 233 passes and it can slide along the longitudinal direction of the connection part 233. The holder 260 has a screw assembly part 261 to be assembled with the screw part 252 of the second spit part 251. A fixing screw 262 is assembled into the holder 260 in the direction transverse to an axis direction of the passing hole 263. The fixing screw 262 functions to fix the position of the holder 260.

As described above, the fixing part 232, the connection part 233 and the first spit part 231 are manufactured by bending a single wire and the second spit part 251 is fixed on the connection part 233 to be capable of sliding. In the present embodiment, only a single second spit part 251 and a single holder 260 are shown; however, the number of the second spit part 251 and the holder 260 can be adjusted.

According to the present invention, it is advantageous that the user can adjust the number of spit parts 231 and 251 as desired. Moreover, the user can change the position of the holder 260 according to the size of the foodstuffs to be cooked. The foodstuffs can be arranged more effectively, and therefore, it is more convenient to cook the foodstuffs.

Figure 5:
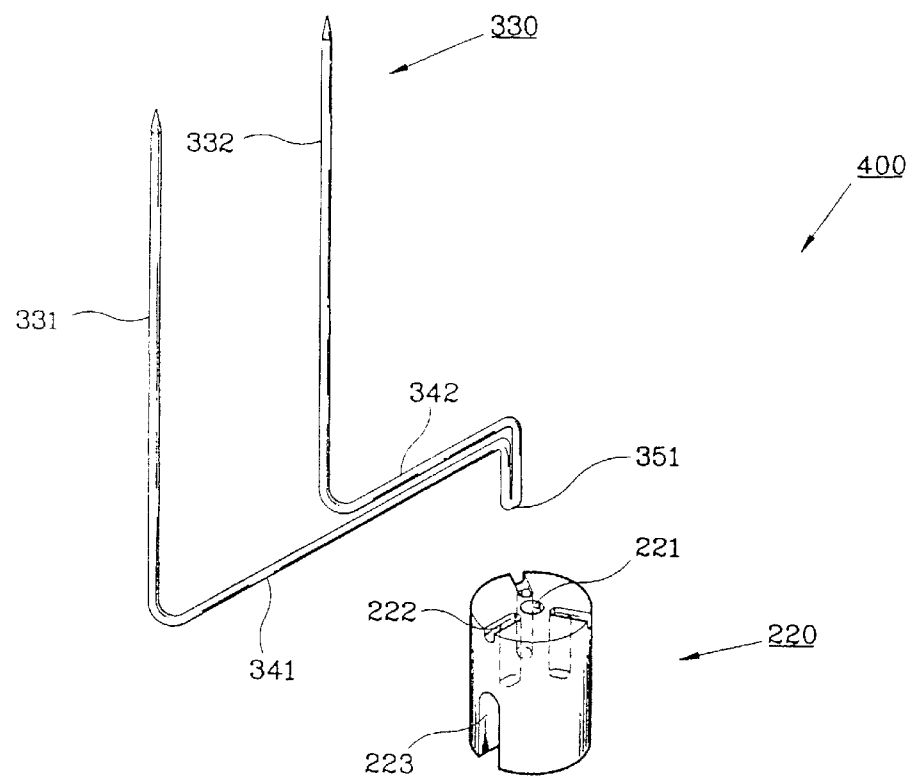
FIG. 5 is an exploded perspective view of a spitting device according to the third embodiment of the present invention.
Figure 5:
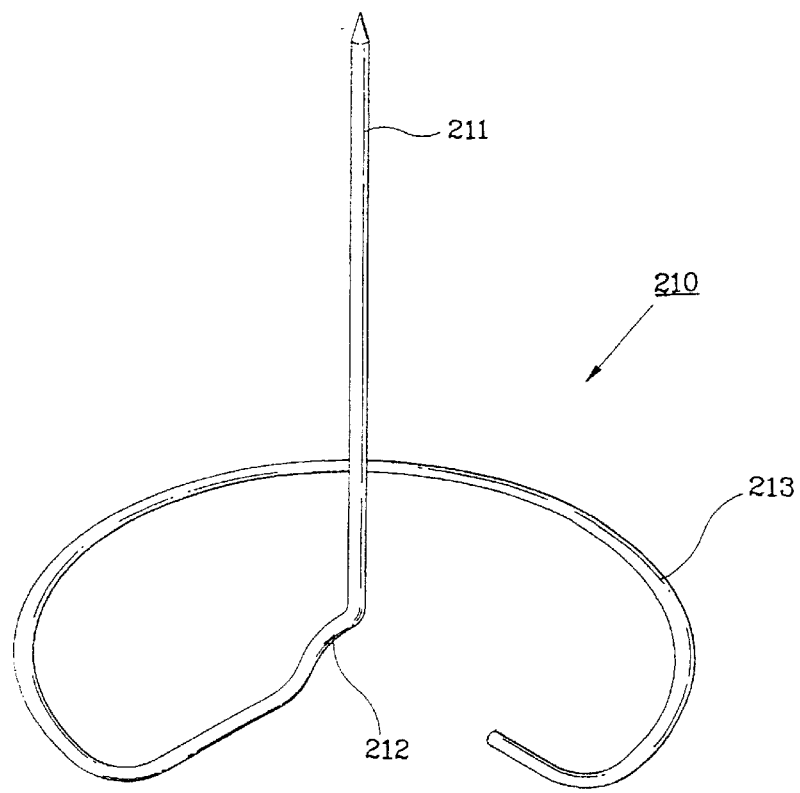

FIG. 5 shows a spitting device 400 according to the third embodiment of the present invention. In the present embodiment, the central spit member 210 and the supporting member 220 are the same in construction as the above-described first embodiment. The only difference of the present embodiment is in the construction of the spit member 330. in the present embodiment, the spit member 330 is comprised of a fixing part 351 assembled with the fixing hole 222 of the supporting member 220, a pair of spit parts 331 and 332 disposed vertically in parallel with each other, and a pair of connection parts 341 and 342 connecting the respective spit parts 331 and 332 to the fixing part 351. The fixing part 351, the connection parts 341 and 342 and the spit parts 331 and 332 are respectively formed by bending a single wire. According to the present embodiment, an additional work for assembling the second spit part 332 is not needed, so it is more convenient to use the spitting device 400.

Figure 6:
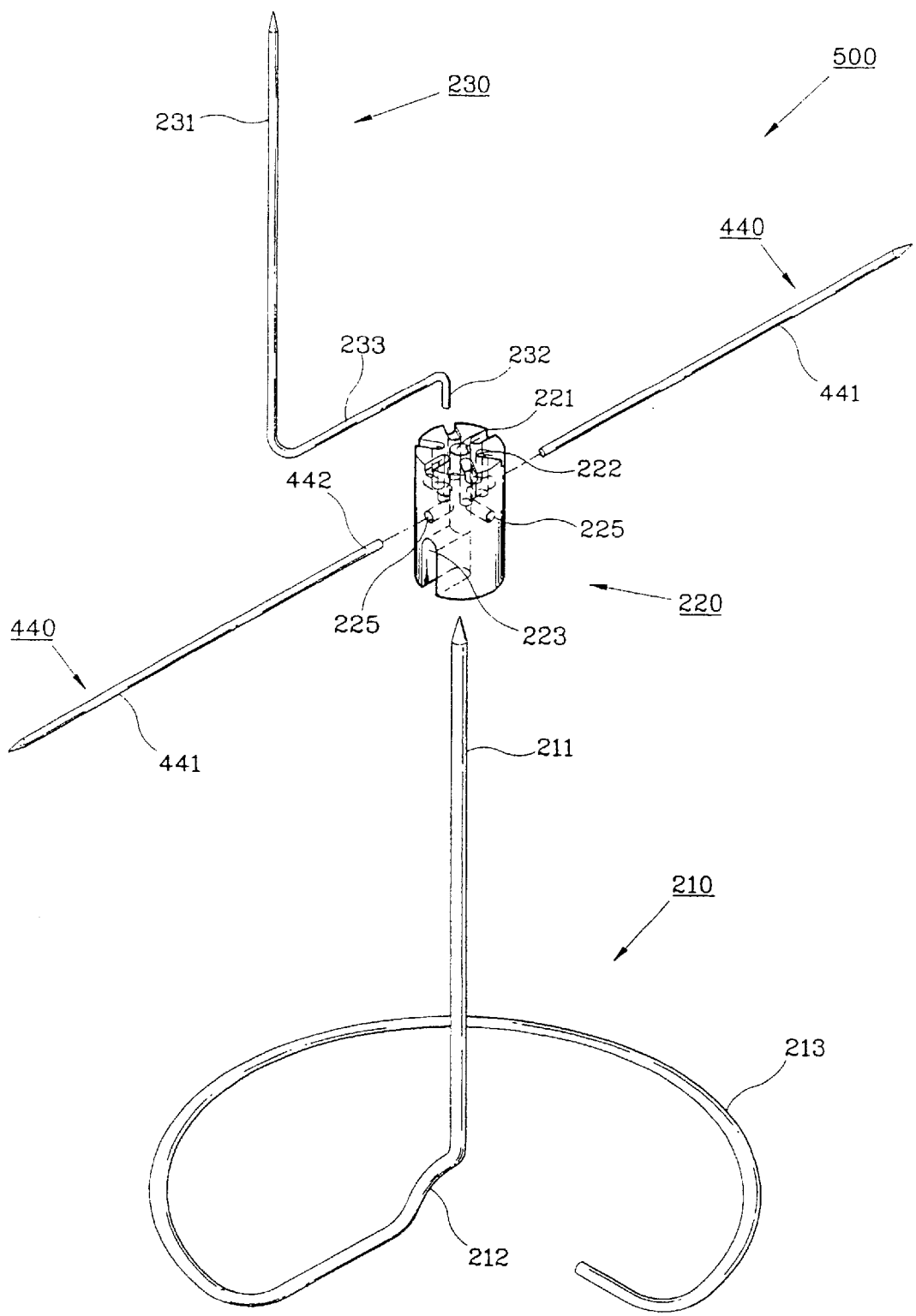
FIG. 6 is an exploded perspective view of a spitting device according to the forth embodiment of the present invention.

FIG. 6 shows a spitting device 500 according to the fourth embodiment of the present invention. In the present embodiment, the central spit member 210 and the supporting member 220 are substantially the same in construction as the above-described first embodiment. The fixing part 232, the connection part 233 and the first spit part 231 formed by bending a single wire are the same in construction as the first embodiment, The only difference of the present embodiment is that the spitting device 500 further comprises a plurality of horizontal spit members 440 assembled into the supporting member 220.

A plurality of additional fixing holes 225 for fixing the horizontal spit members 440 are formed on the circumference of the supporting member 220, and each of the horizontal spit members 440 has a fixing part 442 inserted into the fixing hole 225 and a horizontal spit part 441 extended horizontally from the fixing part 442. Only two horizontal spit members 440 are shown in FIG. 6; however, more than two horizontal spit members 440 can be disposed radially around the supporting member 220.

Using such horizontal spit members 440 which can be removed easily, much more foodstuffs can be supported, and the spitting device 500 becomes more convenient. The spitting device 500 having a single spit member 230 has been shown in FIG. 6 for the convenience of illustration; however, it is preferable that the horizontal spit members 440 according to the present invention are additionally attached to the spitting devices 200, 300 and 400 having a variety of spit members 230, 330.

Figure 7:
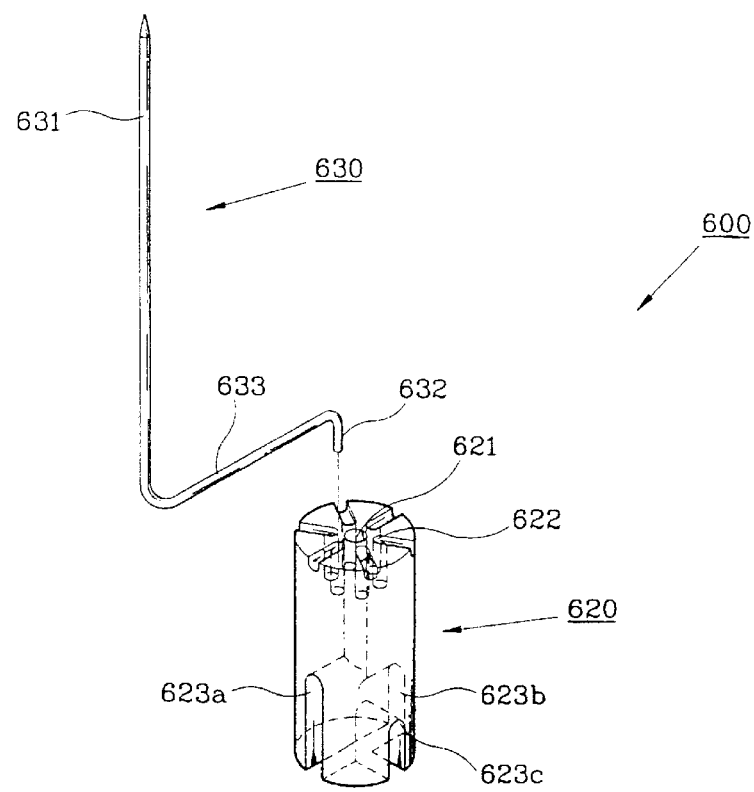
FIG. 7 is an exploded perspective view of a spitting device according to the fifth embodiment of the present invention.
Figure 7:
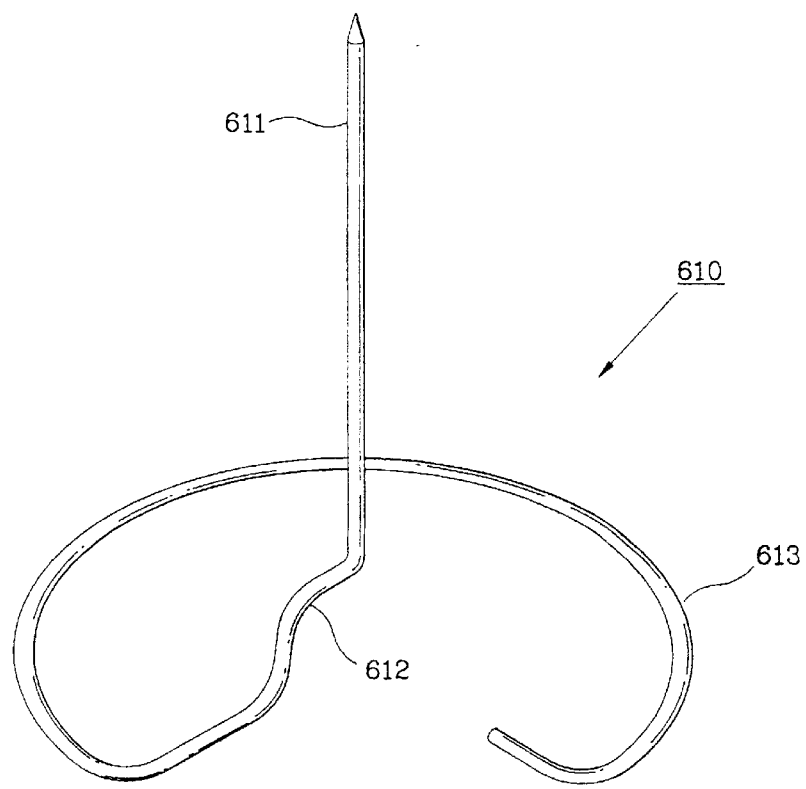

FIG. 7 shows a spitting device 600 according to the fifth embodiment of the present invention. In the present embodiment, the spitting device 600 is comprised of a central spit member 610 for spitting the foodstuff, a supporting member 620 supported by the central spit member 610 and a plurality of spit members 630 removably fixed on the supporting member 620.

The central spit member 610 is manufactured by bending a single wire, and is comprised of an upright central spit part 611 for spitting the foodstuff and a supporting part 613 having the shape of a partial ring extended from the lower end of the central spit part 611. The supporting part 613 functions to support the central spit part 611 to be maintained under the upright state. The part connecting the central spit part 611 and the supporting part 613 with each other is bent into a predetermined shape to form a hooking part 612.

The supporting member 620 has the shape of a cylinder and has a through-going hole 621 formed on the central area thereof, through which the central spit part 611 passes. In addition, a plurality of fixing holes 622 are formed on the upper side of the supporting member 620.

The spit member 630 is comprised of an upright spit part 631 for spitting a foodstuff, a fixing part 632 inserted into the fixing hole 622 and a connection part 633 extended from the fixing part 632 to connect the spit part 631 and the fixing part 632 with each other. The fixing part 632, the connection part 633 and the spit part 631 are formed by bending a single wire. By inserting/disassembling the fixing part 632 into/from the fixing hole 622, the spit member 630 can be fixed/disassembled onto/from the supporting member 620 easily.

A plurality of height-adjusting recesses 623a, 623b and 623c are formed on the lower part of the supporting member 620. The central spit part 611 passes the supporting member 620 through the through-going hole 621, whereby the supporting member 620 can move up and down along the central spit part 611. As shown in FIG. 7, the height-adjusting recesses 623a, 623b and 623c are recessed from the lower end of the supporting member 620, and the recesses are different in depth. Accordingly, the upper ends of the respective height-adjusting recesses 623a, 623b and 623c form hooking sections different in height. The hooking part 612 is selectively assembled with one of the height-adjusting recesses 623a, 623b and 623c, and the height of the supporting member 620 is adjusted according to the depth of the assembled height-adjusting recess 623a, 623b or 623c.

According to the present invention, it is advantageous that the supporting member 620 can be positioned at a proper height desired by a user.

Figure 8:
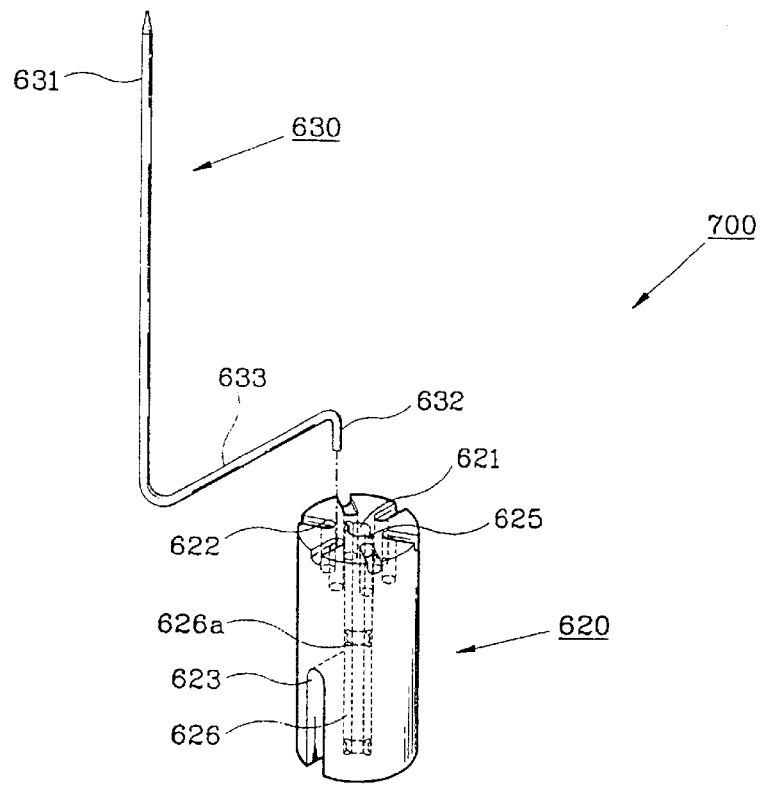
FIG. 8 is an exploded perspective view of a spitting device according to the sixth embodiment of the present invention.
Figure 8:
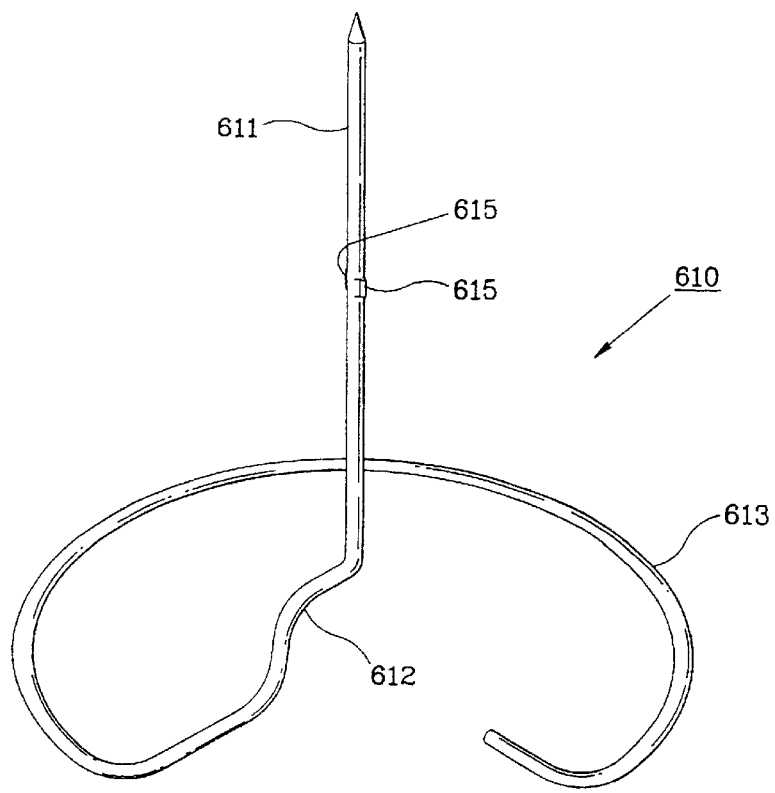
Figure 9:
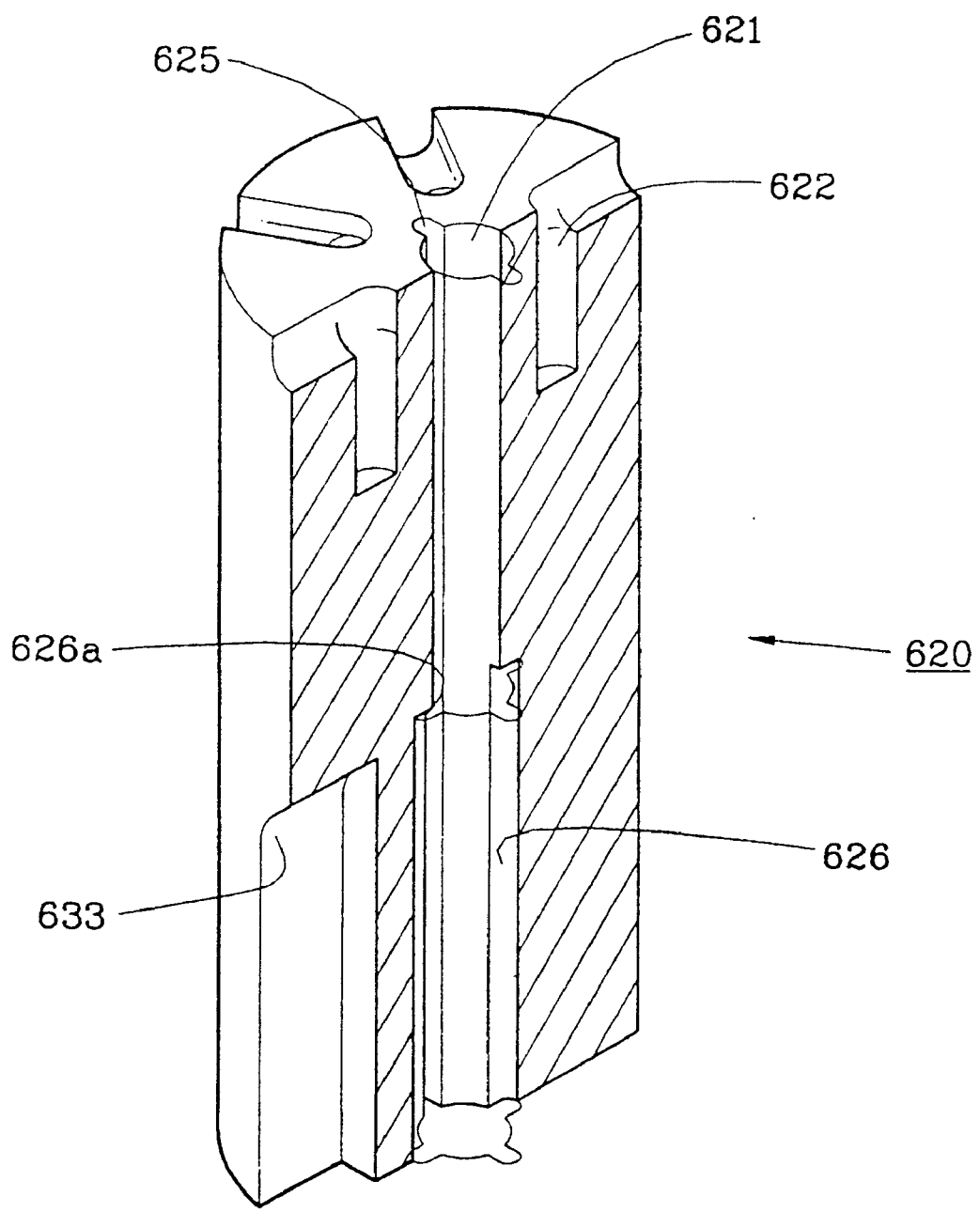
FIG. 9 is a partial cutaway perspective view of a supporting member shown in FIG. 8.

FIGS. 8 and 9 show a spitting device 700 according to the sixth embodiment of the present invention. In the description of the present embodiment, parts identical to those in the fifth embodiment shown in FIG. 7 will be referred to with the same reference numerals, and the detailed description thereof will be omitted.

In the present embodiment, construction of the spit member 630 is the same as that of the above-described fifth embodiment. Furthermore, construction of the central spit member 610 is the same as that of the fifth embodiment except for protrusions 615, and construction of the supporting member 620 is the same as that of the fifth embodiment except for grooves 625 and 626 assembled with the protrusions 615.

The protrusions 615 are formed on the middle portion of the central spit part 611. The central spit part 611 passes the supporting member 620 5 through the through-going hole 621, by which the supporting member 620 can move up and down along the central spit part 611. On the inner surface of the through-going hole 621 are formed two pairs of grooves 625 and 626 vertically. As shown in FIG. 8, length of the first groove 625 is same as height of the supporting member 620, and the second groove 626 is extended from the lower end of the supporting member 620 to the middle portion of the supporting member 620. Therefore, the upper end of the second groove 626 forms hooking sections 626a.

The protrusions 615 are inserted into the first groove 625 or the second groove 626. When the protrusions 615 are inserted into the first groove 625, the supporting member 620 is positioned at the lower end area of the central spit part 611, and therefore, the hooking part 612 is inserted into the hooking recess 623. When the protrusions 615 are inserted into the second groove 625, the protrusions 615 are hooked by the hooking sections 626a, and therefore, the supporting member 620 is positioned at the middle portion of the central spit part 611. Therefore, the user can adjust the position of the supporting member 620 by selecting the grooves 625 or 626 to be engaged with the protrusions 615. The horizontal spit member 440 shown in FIG. 6 can be additionally attached to the spitting devices 600 and 700 according to the fifth and the sixth embodiments of the present invention shown in FIGS. 7 through 9. Then, a number of foodstuffs can be cooked more conveniently.

As described above, according to the present invention, many foodstuffs can be conveniently cooked by employing the spit members respectively having many spit parts. Moreover, the spit members can be positioned at a desirable height according to the size of the foodstuffs. Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A spitting device in a microwave oven, comprising:
   a supporting member having a plurality of fixing holes;
   a plurality of spit members respectively having a fixing part engaged with each of said fixing holes, a connection part extended outward in a radial direction from said fixing part, and a plurality of spit parts in parallel extended upward from said connection part;
   a first part bent upward from an end of said connection part and a second spit part installed in an area between the end of said connection part and said fixing part; and
   said second spit part is removably fixed by a holder installed on the connection part.

2. The spitting device as claimed in claim 1, wherein the second spit part and the holder are screwedly assembled with each other.

3. The spitting device as claimed in claim 1, wherein the holder has a passing hole through which the connection part passes so as to be capable of sliding along a longitudinal direction of the connection part.

4. The spitting device as claimed in claim 3, further comprising a fixing screw assembled to the holder in a direction transverse to an axis direction of the passing hole to fix a position of the holder.

5. The spitting device as claimed in claim 1, further comprising at least one horizontal spit member being assembled to said supporting member and having a horizontal spit part disposed horizontally.

6. The spitting device as claimed in claim 1, with said supporting member composing:
   a through-going hole formed on a central area of said supporting member; and
   a central spit member having a central spit part passing said supporting member through sad through-going hole, and a supporting part extended from a lower end of the central spit part in a radial direction and then curved into an arc shape.

7. A spitting device for cooking barbecue in a microwave oven, comprising:
   a central spit member having an upright central spit part for spitting a foodstuff to be cooked, and a supporting part for supporting the central spit member to stand upright;
   a supporting member having a through-going hole through which the central spit part passes, the supporting member being capable of moving up and down along the central spit part; and
   a plurality of spit members respectively having a spit part for spitting a foodstuff, the spit members being installed removably on the supporting member,
   wherein a hooking part is formed on an area of the central spit member, and a plurality of hooking sections different in height are formed on a lower part of the supporting member, the hooking sections selectively hooked by the hooking part.

8. The spitting device as claimed in claim 7, wherein the hooking part is formed by bending an area of the central spit member, and the hooking sections are formed by a plurality of height-adjusting recesses different in depth, which are recessed upward from a lower end of the supporting member.

9. The spitting device as claimed in claim 7, wherein the hooking part is a protrusion formed on an area of the central spit part and the hooking sections are formed by a plurality of vertical grooves different in length, the grooves being formed on an inner surface of the through-going hole.

10. The spitting device as claimed in claim 7, further comprising at least one horizontal spit member being assembled to the supporting member and having a horizontal spit part disposed horizontally.

11. A spitting device in a microwave oven, comprising:
    a central spit member having an central spit part spitting a foodstuff, a supporting part supporting said central spit member to stand upright, and a protrusion formed on an area of said central spit part;
    a supporting member having a through hole and a groove formed on a longitudinal inner surface of said through hole, being capable of moving up and down along said central spit part while said central spit part passes through said through hole; and
    said protrusion inserted into said groove while said central spit part passes through said through hole.

12. The spitting device of claim 11, with said groove formed on a portion of the entire length of said through hole so as to limit the movement of said central spit part within said through hole.

13. The spitting device of claim 11, with said groove formed on the entire length of said through hole.

14. The spitting device of claim 11, further comprising at least two grooves formed on said longitudinal inner surface of said through hole, each having a length different from each other.

15. The spitting device of claim 14, further comprising:
    a hooking part formed on an area of said central spit member; and
    a plurality of hooking section different in height and formed on a lower part of said supporting member, selectively hooked by said hooking part.

16. The spitting device of claim 11, further comprising:
    a hooking part formed on an area of said central spit member; and
    a plurality of hooking section different in height and formed on a lower part of said supporting member, selectively hooked by said hooking part.

17. The spiting device of claim 11, further comprising:
    a hooking part formed by bending an area of said central spit member; and
    a plurality of hooking sections formed by a plurality of height-adjusting recesses different in depth and recessed upward from a lower end of said supporting member.

18. The spitting device of claim 11, further comprising a plurality of spit members respectively having a spit part spitting a foodstuff, being installed removably on said supporting member.

19. A spitting device in a microwave oven, comprising:

a supporting member having a through hole and a fixing hole;

a central spit member having a central spit part inserted into said through hole, having a supporting part supporting said central spit member to stand upright; and a spit member formed in a single wire, having a plurality of spitting part formed on each end portion of said single wire, having a fixing part formed by bending and folding a portion of said single wire other than each said end portion, said fixing part inserted into said fixing hole.

20. The spitting device of claim 19, further comprising:

said single wire having a predetermined diameter while said fixing part having a second diameter greater than said diameter; and said fixing hole having at least said second diameter, accommodating the insertion of said fixing part.

* * * * *